United States Patent [19]
Kaufman et al.

[11] 3,821,462
[45] June 28, 1974

[54] HIGH CURRENT ELECTRICAL LEAD

[75] Inventors: Warner B. Kaufman, Broadview Heights; Roland Breitwieser, Fairview Park, both of Ohio

[73] Assignee: VEB Filmfabrik Wolfen, Wolfen, Germany

[22] Filed: July 19, 1972

[21] Appl. No.: 273,222

[52] U.S. Cl................... 174/15 C, 174/28, 174/111, 310/4 R
[51] Int. Cl.............................................. H01b 9/04
[58] Field of Search............ 310/3 R, 4 R; 322/2 R; 174/19, 20, 28, 77 R, 111, 15 R, 15 C

[56] References Cited
UNITED STATES PATENTS

| | | | |
|---|---|---|---|
| 2,282,004 | 5/1942 | Scott et al............................ | 174/20 |
| 2,754,349 | 7/1956 | Werner................................ | 174/28 |
| 2,958,721 | 11/1960 | Fiet et al............................ | 174/20 X |
| 3,493,792 | 2/1970 | Untermyer............................ | 310/4 |
| 3,542,938 | 11/1970 | Graneau.............................. | 174/28 |
| 3,585,271 | 6/1971 | Reynolds............................ | 174/15 C |

Primary Examiner—J. D. Miller
Assistant Examiner—Harry E. Moose, Jr.
Attorney, Agent, or Firm—N. T. Musial; G. E. Shook; J. R. Manning

[57] ABSTRACT

An electrical lead has insulators imbedded in an inner conductor rod to form an annulus between the rod and a surrounding outer sheath. This annular space is filled with gas which conducts heat and prevents electrical leakage.

6 Claims, 1 Drawing Figure

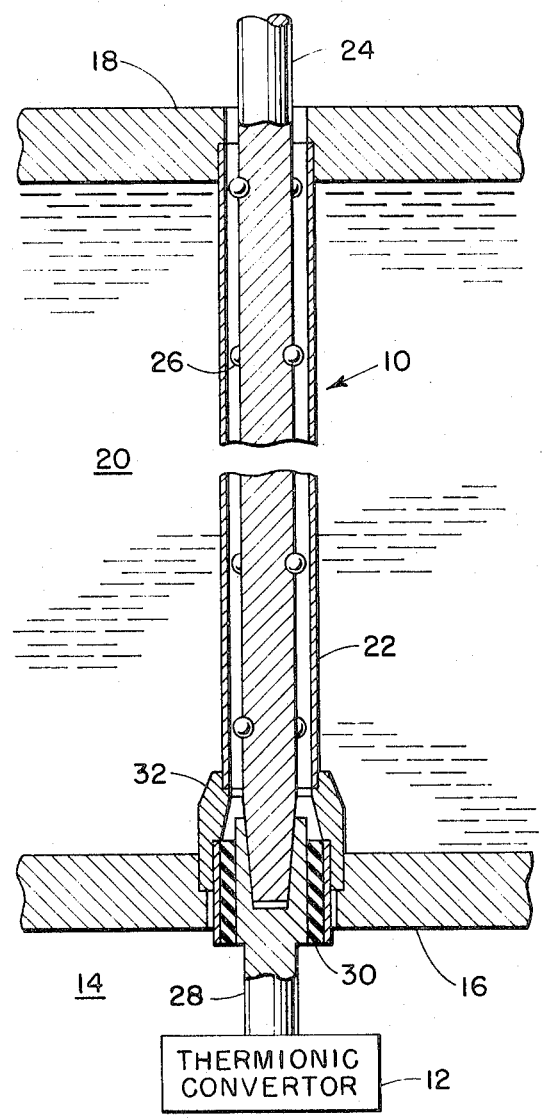

3,821,462

HIGH CURRENT ELECTRICAL LEAD

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention is concerned with an improved electrical lead for use in a high gamma flux. The lead is particularly useful with thermionic converters in nuclear reactors.

Thermionic converters operate in high gamma flux locations of nuclear reactors. Current is removed from such thermionic converters through electrical leads.

Conditions imposed upon the conductors in these leads are more severe than those for conductors of other test devices operating in a nuclear environment. Conductors used in nuclear tests applications have been insulated with swaged magnesia or alumina housed in stainless steel tubes.

Electrical leakage at high current levels is probable with swaged leads due to impurities in the swaged material. Heat flux into the conductor from the hot test piece results in a large expansion of the long conductor. The swaged lead expands mostly at the hot end thus imposing a force on delicate components of the device under test.

SUMMARY OF THE INVENTION

These problems have been solved by an electrical lead constructed in accordance with the invention. Insulating sapphire balls imbedded at spaced distances along an inner conductor rod form a gas annulus between the rod and a surrounding outer sheath of stainless steel tubing. The hot end of the rod is fixed in a cermet insulator. The annular space between the rod and the tube is filled with an inert gas which conducts heat to the stainless steel tube and surrounding water while preventing electrical leakage.

OBJECTS OF THE INVENTION

It is, therefore, an object of the present invention to provide a coaxial conductor in which electrical current leakage is minimized.

Another object of the invention is to provide an improved electrical lead for use in a high gamma flux location in a nuclear reactor.

Another object of the invention is to provide an improved coaxial conductor which utilizes insulating balls imbedded in the conductor to form a gas annulus.

These and other objects of the invention will be apparent from the drawing and specification which follow wherein like numerals are used throughout to identify like parts.

DESCRIPTION OF THE DRAWING

The drawing is a cross-sectional view of an improved coaxial lead constructed in accordance with the present invention.

DESCRIPTION OF THE PREFERRED EMBODIMENT

Referring now to the drawing there is shown an electrical lead assembly 10. This assembly 10 is used to conduct current from a thermionic converter 12 which is capable of producing a very high current.

The thermionic converter 12 is mounted in a nuclear reactor and operates in a high gamma flux area 14 which may be near the reactor core. This high gamma flux area 14 is surrounded by an inner wall 16 forming a housing in the reactor. An outer wall 18 is spaced from the inner wall 16 to form a container that is filled with water 20 for shielding and cooling.

The electrical lead assembly 10 is utilized to conduct high electrical currents from the thermionic converter 12 through the water filled container. The lead assembly 10 has a sheath 22 that that is mounted in the outer wall 18 and extends toward the inner wall 16. The sheath 22 comprises a stainless steel tube. By way of example, a stainless steel tube of 0.250 inch outside diameter and 0.014 inch wall thickness with a length of 60 inches has been satisfactory for the sheath 22 in a typical installation.

An electrically conducting rod 24 extends axially through the sheath 22 and passes through a suitable aperture in the outer wall 18. Aluminum is preferred for the rod 24 because of its low susceptibility to nuclear radiation heating. However, it is contemplated that a copper rod may be used in certain applications. By way of example, an aluminum rod 0.187 inch in diameter by 62 inches long was inserted in the aforementioned stainless steel tube. Such a rod was satisfactory for its intended use.

Spaced insulators 26 engage the rod 24 and conduct the inner surface of the sheath 22. These insulators 26 maintain the rod 24 out of contact with the sheath. Insulators 26 in the form of sapphire balls have been satisfactory. The aforementioned aluminum rod was provided with three 0.062 inch diameter holes which were drilled 0.045 inch deep and 120° apart at one inch intervals. Sapphire balls of 0.062 inch diameter were inserted with a light press fit into these holes. The rod was then inserted into the stainless steel tube to form the lead assembly 10.

An electrical conductor 28 which extends from the thermionic converter 12 is rigidly secured to the end of the rod 24 adjacent the inner wall 16. An insulator 30 surrounds the connected ends of the conductor 24 and 28. The insulator 30 forms a rigid support for these two conductors. A cermet material has been satisfactory for the insulator 30.

A bracket 32 rigidly mounts the insulator 30 in the inner wall 16. The bracket 32 further rigidly mounts the end of the sheath 22 onto the inner wall 16.

As seen in the drawing the ends of the sheath 22 and rigid conductor 24 adjacent the inner wall 16 are both rigidly supported. The conductor 24 is free to expand axially along the sheath 22 away from the insulator 30. Thus there is no load placed on the cermet insulator 30.

The annulus between the rod 24 and the sheath 22 is first evacuated and then filled to about 60 millimeters of mercury inert gas pressure. Helium or argon is satisfactory for this purpose. Heat transmitted along the conductor rod 24 from the thermionic converter 12 is dissipated through this gas and the sheath tube 22 to a water 20. No electrical current leakage is encountered because the annulus is first evacuated and then filled with inert gas of high purity.

While the preferred embodiment of the invention has been known and described it will be appreciated that various structural modifications may be made without departing from the spirit of the invention or the scope of the subjoined claims. By way of exanple, it is contemplated that lead assembly 10 may be used as a coaxial conductor.

What is claimed is:

1. An electrical lead for conducting a high current from a thermionic converter operating in a high gamma flux area in a nuclear reactor that is enclosed in a water filled container comprising
   a tubular sheath extending through said container whereby the water therein cools the same,
   an electrically conducting rod extending axially through said sheath, the outer surface of said rod being spaced from the inner surface of said sheath to form an annulus,
   a low molecular weight inert gas of high purity selected from the group consisting of helium and argon under a pressure of about 60 millimeters of mercury contained in said annulus to conduct heat from said rod to said water cooled sheath and prevent electrical current leakage,
   a plurality of spaced insulators in said annulus for maintaining said rod out of engagement with said sheath, and
   a rigid insulator mounted on the end of said sheath and said rod adjacent to said nuclear reactor, said rod being free to expand axially within said sheath along said spaced insulators away from said rigid insulator and said nuclear reactor.

2. An electrical lead as claimed in claim 1 wherein the electrically conducting rod is of a material selected from the group consisting of aluminum and copper.

3. An electrical lead as claimed in claim 1 wherein the spaced insulators comprise solid spheres of an insulating material.

4. An electrical lead as claimed in claim 3 wherein the solid spheres comprise sapphire balls, said rod being provided with a plurality of spaced recesses for receiving said balls.

5. An electrical lead as claimed in claim 1 wherein the sheath comprises a stainless steel tube.

6. An electrical lead as claimed in claim 1 wherein the rigid insulator comprises a cermet material.

* * * * *

UNITED STATES PATENT OFFICE
CERTIFICATE OF CORRECTION

Patent No. 3,821,462         Dated  June 28, 1974

Inventor(s)     W. B. Kaufman and R. Breitwieser

It is certified that error appears in the above-identified patent and that said Letters Patent are hereby corrected as shown below:

On the title page, after [73] Assignee:

Cancel "VEB FILMFABRIK WOLFEN, Wolfen, Germany" and insert --The United States of America, as represented by the Administrator of the National Aeronautics and Space Administration, Washington, D. C.--

Signed and sealed this 22nd day of October 1974.

(SEAL)
Attest:

McCOY M. GIBSON JR.
Attesting Officer

C. MARSHALL DANN
Commissioner of Patents